Sept. 4, 1923.  
T. K. WILSON  
PULLEY BLOCK AND BEARING  
Filed May 27, 1922
1,466,980
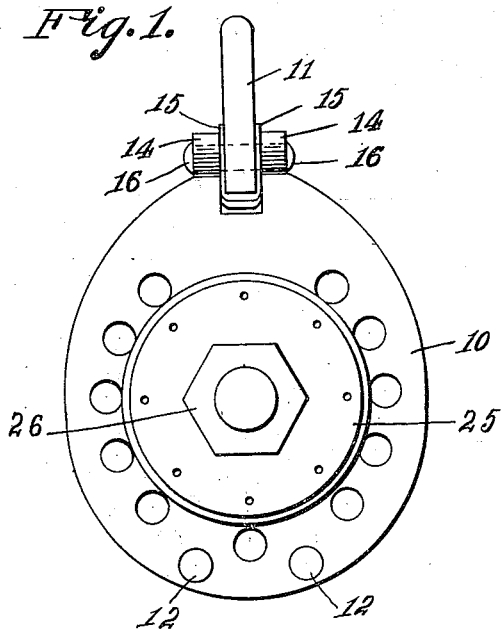
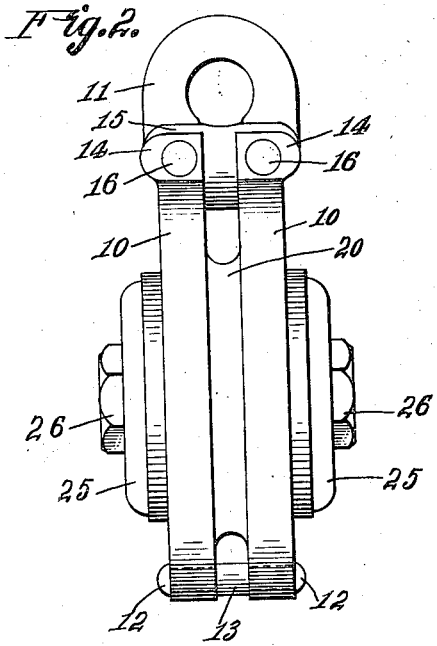
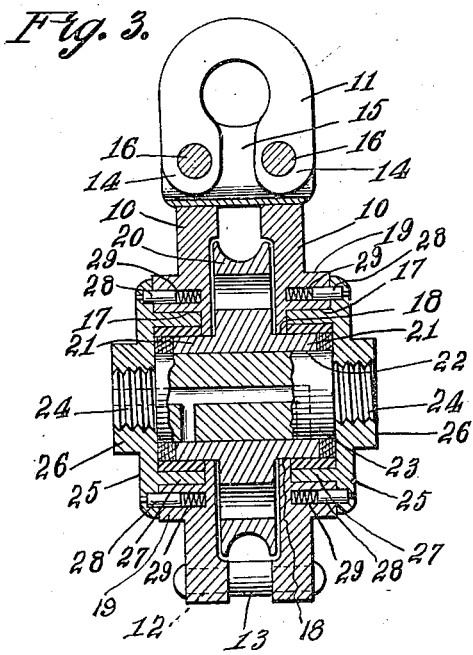
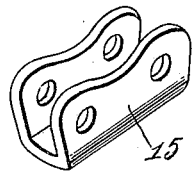
T. K. Wilson
INVENTOR
BY Victor J. Evans
ATTORNEY
WITNESS: Leo Hayes Patented Sept. 4, 1923.

1,466,980

UNITED STATES PATENT OFFICE.

THOMAS K. WILSON, OF KERRY, OREGON.

PULLEY BLOCK AND BEARING.

Application filed May 27, 1922. Serial No. 564,128.

*To all whom it may concern:*

Be it known that I, THOMAS K. WILSON, a citizen of the United States, residing at Kerry, in the county of Columbia and State of Oregon, have invented new and useful Improvements in Pulley Blocks and Bearings, of which the following is a specification.

This invention relates to block and tackle and has for its object the provision of a pulley block having a novel bearing structure which will insure maximum strength combined with easy running qualities so that greatest efficiency will be attained.

An important object is the provision of a bearing which provides internal and external support for the roller so that great strength and durability will be assured.

An important object is the provision of a device of this character which will be simple and inexpensive in manufacture, efficient and durable in service and a general improvement in the art.

With the above and other objects and advantages in view the invention consists in the details of construction to be hereinafter more fully described and claimed and illustrated in the accompanying drawings in which:

Figure 1 is a side elevation of the device,

Figure 2 is an edge view,

Figure 3 is a sectional view taken longitudinally of the axle, and

Figure 4 is a detail perspective view of the spacer.

Referring more particularly to the drawings I have shown the block as comprising spaced side plates 10 with which is connected a hanger 11 by means of which the device may be suspended. These side plates are secured together by means of bolts or rivets 12 which pass through the side plates and also through spaced sleeves 13 which abut against the inner faces of the side plates. The connection for the hanger consists of apertured ears 14 formed on the side plates and between which is located a spacer 15 which is U-shaped in cross section and the hanger is connected with the ears by means of pins 16 which pass through the ears, through the sides of the spacer 15 and also through the apertured ends of the hanger which is itself of inverted U-shape. The side plates are formed with recesses 17 at the centers of which are holes 18 and the recesses are surrounded by outwardly extending flanges 19.

The wheel or pulley 20 is located between the side plates 10 and is formed with oppositely extending hub portions 21 journaled within the holes 18 and terminating nearly flush with the edges of the flanges 19. This pulley is formed with a bore 22 which extends entirely through the hubs and which is of uniform diameter.

The numeral 23 designates the axle which fits within the bore 22 and which is provided at its ends with reduced threaded extensions 24. Engaged upon each of these extensions is a nut 25 which is formed with an angular portion 26 adapted for engagement by a wrench or the like for effecting turning movement. Each nut member further includes a flange 27 which is spaced from the axle and which fits within the recess 17 and about the hub 21 so as to form a bearing for the inside as well as the outside of the hub of the pulley. Instead of being in one piece the nut may be bushed if preferred though this is a mere mechanical detail which may be resorted to without departing from the spirit of the invention.

To prevent unscrewing of the parts, I provide a nut lock which consists of a spring pressed plunger 28 engageable within selected notches 29 in each nut member.

In use the device is of course employed in the same manner as similar devices for the same purpose but has the great advantage of providing ample supporting bearings which will greatly minimize wear on the moving parts while insuring free and easy movement thereof. Owing to the simplicity of the construction and the fewness of the parts it is apparent that there is nothing to get out of order and that the device should have a long life and satisfactorily perform all the functions for which it is intended.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A block comprising a pair of side plates secured in spaced parallel relation and provided with a hanger, said side plates being each formed with a recess having a hole therein, the recess being bounded by a flange, a pulley disposed between the side plates and formed with oppositely extending hubs journaled in said holes, the pulley being formed with a bore passing through the hubs, an axle disposed within said bore and having its ends reduced and threaded, and a nut member disposed on each threaded extension, each nut member having an angular tool engaging face and being formed with a flange spaced from the axle and received within one of said recesses in engagement with the first named flange and the outside of the associated hub.

2. A block comprising a pair of side plates secured in spaced parallel relation and provided with a hanger, said side plates being each formed with a recess having a hole therein, the recess being bounded by a flange, a pulley disposed between the side plates and formed with oppositely extending hubs journaled in said holes, the pulley being formed with a bore passing through the hubs, an axle disposed within said bore and having its ends reduced and threaded, and a nut member disposed on each threaded extension, each nut member having an angular tool engaging face and being formed with a flange spaced from the axle and received within one of said recesses in engagement with the first named flange and the outside of the associated hub, and a spring pressed locking plunger mounted on each side member and co-operating with notches in the adjacent nut member.

In testimony whereof I affix my signature.

THOMAS K. WILSON.